Feb. 11, 1969   J. F. DREYER ETAL   3,426,728
APPARATUS FOR PRODUCING ORIENTED PATTERNS
Filed Oct. 15, 1964
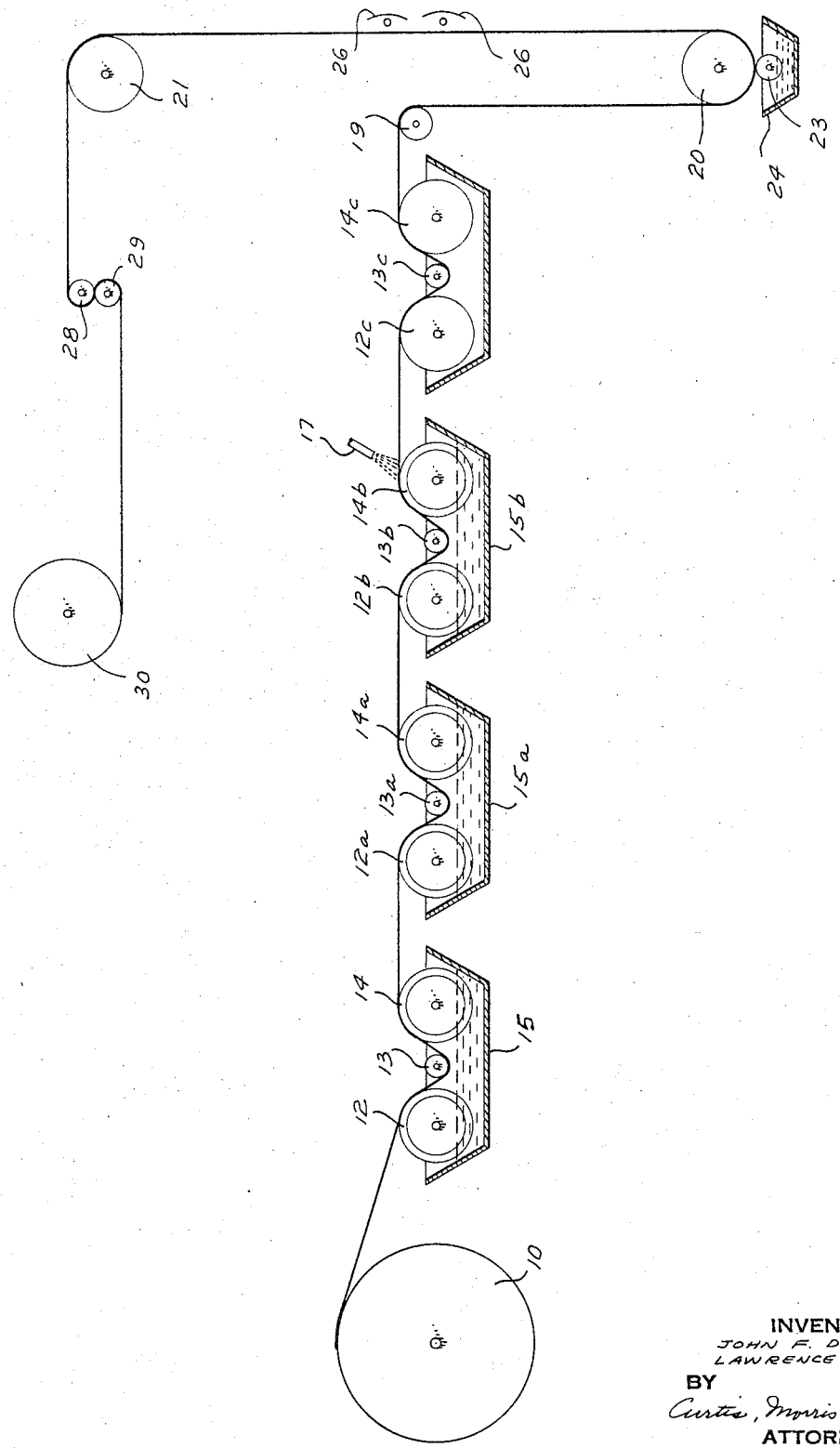
INVENTORS
JOHN F. DREYER
LAWRENCE H. HUTFLES
BY
Curtis, Morris & Safford
ATTORNEYS

United States Patent Office 3,426,728
Patented Feb. 11, 1969

3,426,728
APPARATUS FOR PRODUCING ORIENTED PATTERNS
John F. Dreyer and Lawrence H. Huttles, Cincinnati, Ohio, assignors to John F. Dreyer, Cincinnati, Ohio
Filed Oct. 15, 1964, Ser. No. 404,139
U.S. Cl. 118—73
Int. Cl. B05c 1/12, 3/02
2 Claims

ABSTRACT OF THE DISCLOSURE

Apparatus for producing polarizing devices comprising, in combination, means for brushing the surface of a carrier sheet, including means for supplying an abrasive slurry to the sheet during brushing; washing means; means for removing excess wash liquid; and a roller fountain for applying dye to the brushed and washed surface.

---

This invention relates to an apparatus for applying polarizing coatings onto flexible films.

It is already known from the prior patents of John F. Dreyer Nos. 2,400,877 and 2,524,286, etc., that a transparent sheet such as glass or transparent polymer film can be coated with a dichroic dye solution and, if the solution is dried rapidly through its nematic state while exposed to an orienting field, e.g., a field produced by brushing the surface of the film, will exhibit the property of polarizing light. My present invention is primarily useful for the continuous and economical manufacture of such coated films.

The accompanying drawing shows diagrammatically a preferred embodiment of the apparatus. In this, the film which is to be oriented and have a polarizing coat developed thereon, is drawn from a supply roll shown at 10. This may be any of a variety of the transparent films, such as Videne (terephthalate polyester), Lexan, polycarbonate resin, understood to be a product of bisphenol A and phosgene, i.e., carbonyl chloride, giving a formula ($—COOC_6H_5C(CH_3)_2C_6H_5O—)_n$, Mylar, a polyethylene terephthalate, Ethocel (ethyl cellulose) etc.

The film is drawn from the supply roll 10 through a cluster of rolls 12, 13, 14, going over 12 and over 14 and under 13. Rolls 12 and 14 are each felt covered and are driven at surface speeds relative to the contacting film about three times as fast as the linear speed of the film. The roll 12 rotates counter-clockwise and the roll 14 clockwise, so that it maintains a light tension against the roll 13 and so that the film is rubbed by the felt surfaces of these rollers 12 and 14. The roll 13 is made of any suitable material which withstands exposure to the slurry in the tray 15. For example, the roll 13 may be stainless steel or a rubber covered roll.

Under this cluster 12–14 is a tray 15 extending up so that rolls 12 and 14 dip into its liquid bath; but, preferably, the bottom of the roll 13 is slightly above the liquid level in this tray.

The tray contains a slurry adapted for assisting the felt rolls in orienting the surface of the film. Practical experience has indicated that the best for this purpose is a slurry of jeweler's rouge in water. The rouge may be a polishing grade of zirconium oxide, red iron oxide, tin oxide, or other equivalents.

From the roller 14, the film passes horizontally to a second cluster like the first, composed of three rolls 12a, 13a and 14a, which may be the same as the rolls 12, 13 and 14; or, if desired, the felt jackets on rolls 12a and 14a may be omitted, as this is primarily a wash operation. The tray 15a contains wash water; and its level may extend somewhat higher than in the tray 15, but is not critical.

Again, the film passes horizontally to a third cluster of rolls 12b, 13b and 14b, in a tray 15b. Here it is important that the water be not only clean, but also free from dissolved solids so that it will not leave a residue when any part of the wash water dries on the surface of the film 10. The tray 15b is provided with an overflow drain at a level high enough so that the water collects in the tray 15b and washes off any rouge slurry remaining on the film or on the rolls; and above the roll 14b is a spray pipe 17 adapted to spray pure water onto the film on the roll 14.

As a source of the pure water for this purpose one may use a condensate or "frost" from refrigeration coils, or rain water if collected where there is not too much contamination in the atmosphere, but ordinarily it would be a local water supply purified by a usual technique, such as ion exchange, to remove dissolved solids and leave only evaporatable liquids.

The film still moves on horizontally to a fourth cluster of rolls 12c, 13c and 14c. These act as rotary squeegies, or squeeze rolls, to remove adherent liquid, so far as possible, from the surface of the film, and to this end they may be rubber covered with a thin spiral rubber blade so that water is scraped off from the surface and laterally off the edge of the film.

A further horizontal traverse brings the film to an idler roll 19. Thence the film passes vertically downward to an idler roll 20 and around it and back up to idler roll 21.

Beneath the roll 20 is a "fountain" roller 23 which operates in a trough 24 supplied with a dye solution of the character described in the prior patents of John F. Dreyer referred to above. The surface of the roll 23 is advantageously roughened, e.g., by sand blasting or sandpapering with coarse flint paper so that it will hold a film of the dye solution more effectively.

We have found an important advantage in making this roll 23 of aluminum or aluminum alloy, as the film of aluminum oxide which inevitably occurs at the surface of such metal is particularly good for being wet by the solution and therefore conveying a suitable film. This effect may be enhanced even, and especially, if the roll is not of aluminum by incorporating surfactants in the dye solution to reduce the surface tension and improve the distribution of the liquid on the surface of the roll. The dye solution is advantageously of relatively high concentration, but in general should not exceed ten percent. In practical operation, we have found a concentration of seven to eight percent of the dichroic dye is most advantageous.

The rolls 20 and 23 are advantageously urged together lightly and resiliently, e.g., by means of a spring which exerts a force slightly greater than the gravity effect on the roll 23, the roll 20 being mounted on a fixed pivot. Thus, a coat of the dye solution from the tray 24 is carried on the surface of the roll 23 up above the body of the solution and into contact with the film 10 on the bottom of roll 20. The light squeezing action between the rolls 20 and 23 serves effectively to transfer the coat of solution to the film 10, and it is carried on upward on that film, e.g., a distance of a foot or more, during which the solvent begins to evaporate, and thence past radiant heaters 26 to accelerate the drying, and finally through a distance of another two feet or more, to the roll 21.

Radiant heaters 26 are advantageously Calrod electric resistance units, each of length about equal to the width of the film 10, and each in a cylindrical parabolic reflector so as to give uniform and efficient heating across the sheet. The Calrod heater is understood to be a standard electrical resistance unit of refractory material sealed within a refractory metal tube from which the resistance unit is insulated by a refractory insulation filling.

As safety regulations, both health and fire protection, will ordinarily require, the loop including rollers 19, 20 and 21, and the heaters 26 and the tray 24, should be enclosed within a housing, a controlled ventillation should be provided with solvent recovery, or satisfactory disposal of vapors, so as to avoid objectionable contamination of ambient atmospheres.

The film 10, by the time it reaches the idler roll 21, will have on its outside a dried coat of the dichroic dye picked up as solution from the tray 24 and dried at 26. Because the rubbing by the rolls 12 and 14 has produced an orienting field on the surface of the film, this dye coating will have been fully oriented as it passed through its nematic state during drying and will have been rapidly set in its oriented condition by the heating at 26.

The completed film passes on from the idler roll 21 over idler rolls 28 and 29 and to a wind-up roll 30. If desired, the film may be coated with a lacquer on top of the dye coat, between the rolls 21 and 28 or may be laminated with another film, either a thermoplastic film heated to soften its contacting surface, or having thereon an adhesive coating, e.g., a thermoplastic heated to a temperature at which it is adhesive. However, this is not necessary, but is merely a precaution to protect the dye film against scuffing or other mechanical abuse.

The normal friction and inertia of the machine provides a drag on the film 10 which is normally sufficient to keep the film tight against the several rolls and substantially straight between them, but if local conditions require longer passes or for other reason a greater tension is desired, one may provide additional drag means, e.g., a friction brake on the feed roll.

This machine is compact, being, for example, approximately eight feet long and approximately four feet from bottom to top, is economical to operate, requiring little power, and most importantly, it is rapid, for example, in normal use we operate at linear speed of the film about sixteen feet per minute and even higher speeds can be used. The product is of exceptional uniformity and the thickness and density of the coating is subject to a control by the design of the machine. Thus, the amount of dye in the film is a function of the concentration and viscosity of the dye solution supplied at 24, the character of the surface i.e., the ability to hold a film of the dye, and the speed of travel.

What we claim is:

1. Apparatus for producing polarizing devices which comprises means for supplying a flexible carrier sheet with its transverse axis substantially horizontal; brushing means for brushing the surface of said sheet along respectively parallel lines to produce a parallel oriented field effect in said sheet, said brushing means including means for supplying an abrasive slurry to the surface of said sheet during brushing; washing means for removing said slurry after brushing; squeeze rolls for removing excess wash liquid; a roller fountain for applying a dye film to the surface of the brushed and washed sheet from which excess wash fluid has been removed, said roller fountain comprising a first roll around which said sheet is passed and a second roll comprising the roller of said roller fountain, said first and second rolls being opposite and adjacent and under light and resilient compression; a third roll spaced beyond said roller fountain to which the dyed sheet is passed; drying means between said roller fountain and said third roll adapted to dry said dye film; and driven pull rolls beyond said drying means engaging said sheet for pulling it through the apparatus and keeping it tight against the rolls thereof and substantially straight between them.

2. Apparatus as in claim 1 wherein said brushing means are a felt covered roll rotatably mounted with its axis of rotation extending transversely across said carrier sheet and driven in a sense contrary to the direction of movement of the carrier sheet passing thereover.

References Cited

UNITED STATES PATENTS

| | | | |
|---|---|---|---|
| 1,783,429 | 12/1930 | Johnson | 118—73 XR |
| 2,053,730 | 9/1936 | Minkow. | |
| 2,966,425 | 12/1960 | Fucinari et al. | 118—73 XR |
| 3,237,231 | 3/1966 | Zink | 15—102 |

ROBERT W. MICHELL, *Primary Examiner.*

R. I. SMITH, *Assistant Examiner.*